United States Patent [19]

Ito

[11] Patent Number: 5,237,176
[45] Date of Patent: Aug. 17, 1993

[54] METHOD OF ENERGY SUBTRACTION FOR RADIATION IMAGE AND APPARATUS FOR CARRYING OUT THE METHOD

[75] Inventor: Wataru Ito, Kanagawa, Japan

[73] Assignee: Fuji Photo Film Co., Ltd., Kanagawa, Japan

[21] Appl. No.: 774,866

[22] Filed: Oct. 11, 1991

[30] Foreign Application Priority Data

Oct. 18, 1990 [JP] Japan .................................. 2-280466

[51] Int. Cl.⁵ ....................... G03B 42/02; G01N 23/04
[52] U.S. Cl. .................................................. 250/587
[58] Field of Search ........................ 250/327.2, 484.1

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 250/327.2 |
| 4,356,398 | 10/1982 | Komaki et al. | 250/327.2 |
| 4,387,428 | 6/1983 | Ishida et al. | 250/327.2 |
| 4,590,517 | 5/1986 | Kato et al. | 358/111 |
| 4,855,598 | 8/1989 | Ohgoda et al. | 250/327.2 |
| 4,896,037 | 1/1990 | Shimura et al. | 250/327.2 |
| 4,943,723 | 7/1990 | Adachi et al. | 250/327.2 |
| 4,992,664 | 2/1991 | Shimura et al. | 250/327.2 |
| 5,049,746 | 9/1991 | Ito | 250/327.2 |
| 5,122,664 | 6/1992 | Ito et al. | 250/327.2 |

FOREIGN PATENT DOCUMENTS

| | | | |
|---|---|---|---|
| 0363907 | 4/1990 | European Pat. Off. | 250/327.2 |
| 2104174 | 4/1980 | Japan . | |
| 56-11395 | 2/1981 | Japan . | |
| 61-5193 | 2/1986 | Japan . | |

Primary Examiner—Carolyn E. Fields
Assistant Examiner—Drew A. Dunn
Attorney, Agent, or Firm—Sughrue, Mion, Zinn, Macpeak & Seas

[57] ABSTRACT

A plurality of radiation images of an object is recorded on a plurality of recording sheets by exposing the recording sheets to radiations which have different energy distributions and have passed through the object. The plurality of radiation images are read out and a plurality of image signals which respectively represent the plurality of radiation images are obtained. A correction formula according to which correction of one or more of the image signals for superposing the radiation images represented by the respective image signals one on another is effected for each picture element is obtained and subtraction processing is effected for each picture element while the aforesaid correction is effected for each picture element according to the correction formula.

In other words, the steps of correction, superposition and subtraction are performed consecutively and on a picture element by picture element basis.

6 Claims, 3 Drawing Sheets

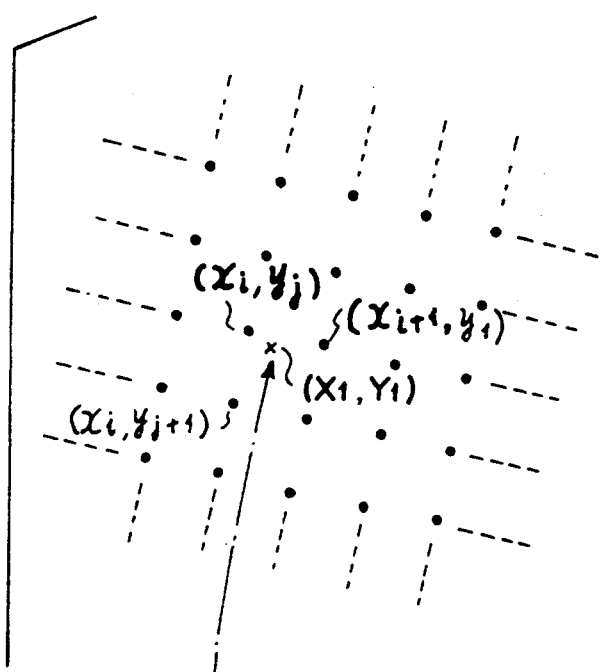
FIG.4
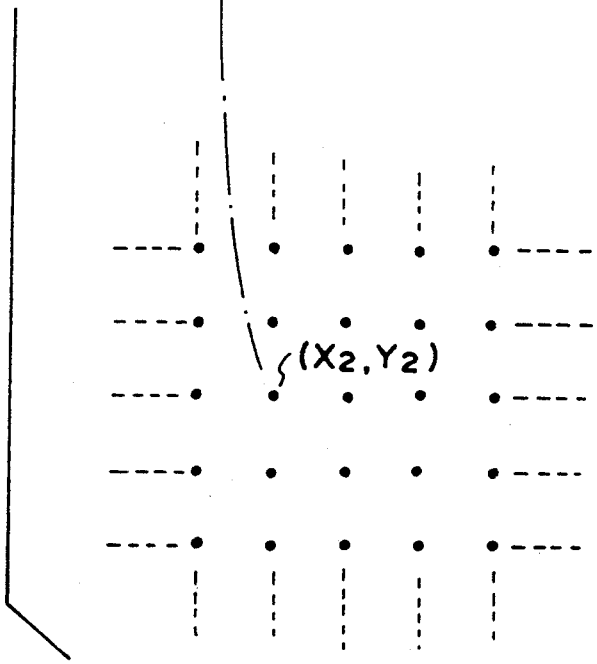

METHOD OF ENERGY SUBTRACTION FOR RADIATION IMAGE AND APPARATUS FOR CARRYING OUT THE METHOD

BACKGROUND OF THE INVENTION

1. Field of the Invention

This invention relates to a method of energy subtraction for a radiation image and an apparatus for carrying out the method.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets are used, subtraction processing techniques for radiation images are often carried out on image signals detected from a plurality of radiation images of an object which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

In the method disclosed in U.S. Pat. No. 4,896,037, two radiation images recorded by exposing an object to radiations having different energy levels are read out to obtain digital image signals respectively representing the two radiation images and energy subtraction process is carried out on the basis of these digital image signals. However, this method is disadvantageous in that if the object moves between the first and second recordings, the two radiation images differ from each other and a false image (motion artifact) appears in a visible image reproduced on the basis of the image signal obtained by the subtraction processing due to the inconformity between the two original images (the radiation images subjected to energy subtraction processing), which substantially deteriorates image quality of the visible image reproduced.

In the method disclosed in U.S. Pat. No. 4,855,598, two original images are obtained by one recording by exposing a pair of recording sheets superposed one on another, with a filter which exhibits different radiation absorptivity depending on the radiation energy intervening therebetween, to radiation which has passed through an object. When this method is employed, a false image due to movement of the object cannot appear.

However, in the method, the two recording sheets are disposed in different positions and accordingly they are positioned at different distances from the radiation source and the object, whereby the radiation images recorded on the respective recording sheets differ from each other in size, which produces a false image.

In order to prevent production of a false image, in the method disclosed in Japanese Unexamined Patent Publication No. 2(1990)-104174, two marks are recorded together with the radiation image on each of the recording sheets superposed one on another with such a filter intervening therebetween and the radiation images recorded on the respective recording sheets are read out to obtain image signals representing the radiation images. One of the image signals is corrected so that the distances between the two marks on the respective image signals become equal to each other, and then the image signal obtained by thus correcting said one image signal is subjected to an energy subtraction processing together with the other image signal.

However, this method is disadvantageous in that a memory for storing the corrected image signal representing a whole radiation image is required, which leads to cost increases.

SUMMARY OF THE INVENTION

In view of the foregoing observations and description, the primary object of the present invention is to provide a method of energy subtraction for a radiation image which can overcome the problems inherent to the conventional methods of energy subtraction at low cost.

Another object of the present invention is to provided an apparatus for carrying out the method.

The method of energy subtraction for a radiation image in accordance with the present invention comprises the steps of recording a plurality of radiation images of an object on one or more recording sheet(s) by exposing the recording sheet(s) to radiations which have different energy distributions and have passed through the object, reading out the plurality of radiation images, thereby obtaining a plurality of image signals which respectively represent the plurality of radiation images, obtaining a correction formula according to which correction of one or more of the image signals for superposing the radiation images represented by the respective image signals one on another is effected for each picture element and effecting subtraction processing for each picture element while effecting said correction for each picture element according to the correction formula.

The apparatus for energy subtraction in accordance with the present invention comprises a recording unit having a radiation source which emits radiations, an object positioning portion at which an object is positioned and a recording sheet supporting portion which are opposed to the radiation source with the object positioning portion intervening therebetween and at which is positioned a recording sheet assembly on which a plurality of radiation images of the object are recorded by exposing the recording sheet assembly to radiations which have different energy distributions and have passed through the object, a read-out unit for reading out the plurality of radiation images recorded on the recording sheet assembly, thereby obtaining a plurality of image signals which respectively represent the plurality of radiation images, a correction unit for obtaining a correction formula according to which correction of one or more of the image signals for superposing the radiation images represented by the respective image signals one on another is effected for each picture element and a calculation unit for effecting subtraction processing for each picture element while effecting said correction for each picture element according to the correction formula obtained by the correction unit.

In accordance with the present invention, since a correction formula according to which correction for superposing a plurality of radiation images one on another is effected for each picture element is obtained and subtraction processing is effected for each picture element while said correction is effected for each picture element according to the correction formula, it is not necessary to store the corrected image signal which represents a whole radiation image and accordingly, no additional memory is required, which leads to cost decreases.

BRIEF DESCRIPTION OF THE DRAWINGS

FIG. 4 is a schematic view showing the picture elements on the first and second X-ray images.

DESCRIPTION OF THE PREFERRED EMBODIMENT

Figure 1:
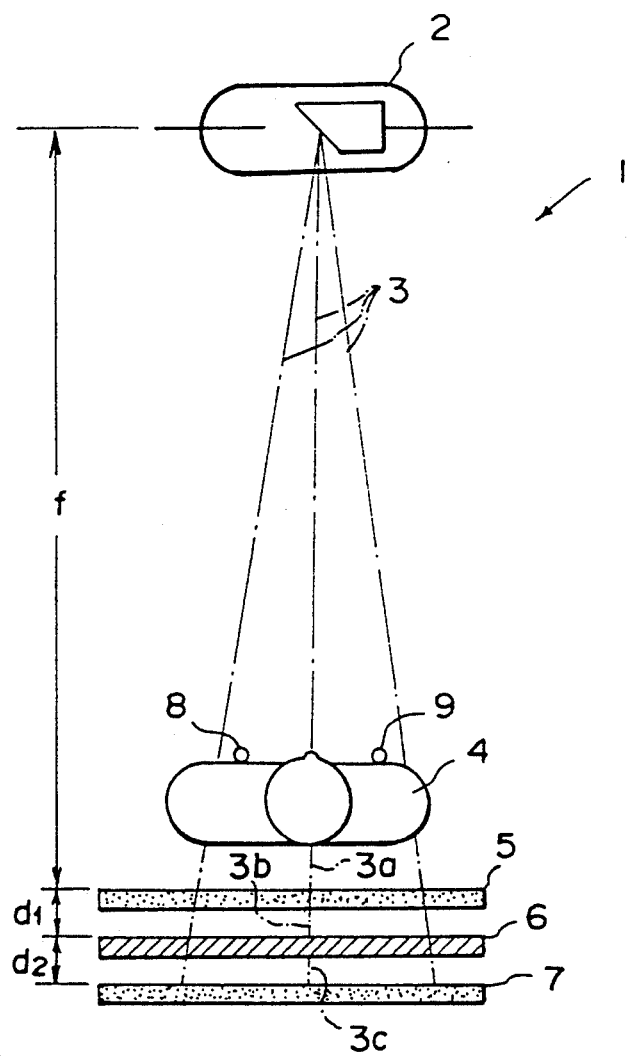
FIG. 1 is a schematic view showing an X-ray image recording apparatus which forms a recording unit of an energy subtraction apparatus in accordance with an embodiment of the present invention.

With reference to FIG. 1, X-rays 3 are produced by an X-ray tube 2 of the X-ray image recording apparatus 1 and irradiated to an object 4. X-rays 3a, which have passed through the object 4, impinge upon a first stimulable phosphor sheet 5, and a part of the energy of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 and X-rays 3c, which have passed through the filter 6 impinge upon a second stimulable phosphor sheet 7. In this manner, an X-ray image of the object 4 is stored on the second stimulable phosphor sheet 7. During the image recording operation, marks 8 and 9 are placed on the object 4. The images of the markers 8 and 9 are utilized in the course of adjusting the sizes of the two X-ray images so that the two X-ray images coincide with each other as will be described later.

Figure 2:
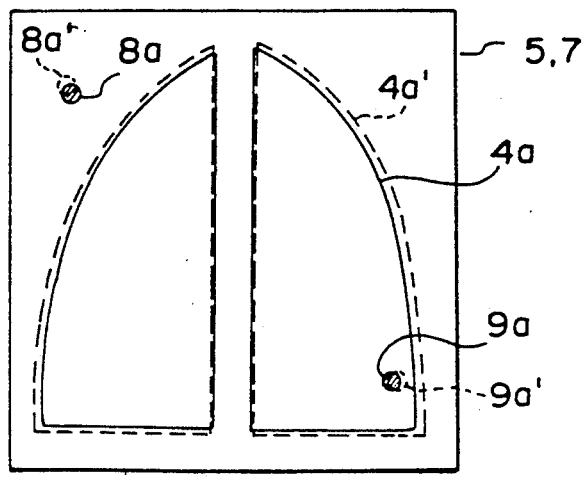
FIG. 2 is a schematic view showing X-ray images stored on the respective stimulable phosphor sheets.

FIG. 2 schematically shows the X-ray images stored on the first and second stimulable phosphor sheets 5 and 7.

A first X-ray image 4a of the object 4 having images 8a and 9a of the markers 8 and 9 is stored on the first stimulable phosphor sheet 5 substantially over the entire area thereof, and similarly, a second X-ray image 4a' of the object 4 having images 8a' and 9a' is stored on the second stimulable phosphor sheet 7 substantially over the entire area thereof. The images 8a, 8a', 9a and 9a' of the markers 8 and 9 will be referred to as "marks", hereinbelow. The marks 8a and 9a and the marks 8a' and 9a' are stored on positions on the respective stimulable phosphor sheets 5 and 7 corresponding to each other. Utilizing the marks 8a, 9a, 8a' and 9a', position adjustment processing is carried out on the image signals obtained from the X-ray images 4a and 4a' so that they coincide with each other.

As can be seen from FIG. 1, the distances from the X-ray tube 2 and the object 4 of the first and second stimulable phosphor sheet 5 and 7 differ from each other, and accordingly, the radiation images 4a and 4a' respectively stored on the first and second stimulable phosphor sheets 5 and 7 differ from each other in size, and the position of the marks 8a and 9a on the first stimulable phosphor sheet 5 differs from the position of the marks 8a' and 9a' on the second stimulable phosphor sheet 7. The difference in size between the radiation images 4a and 4a' causes a false image.

Figure 3:
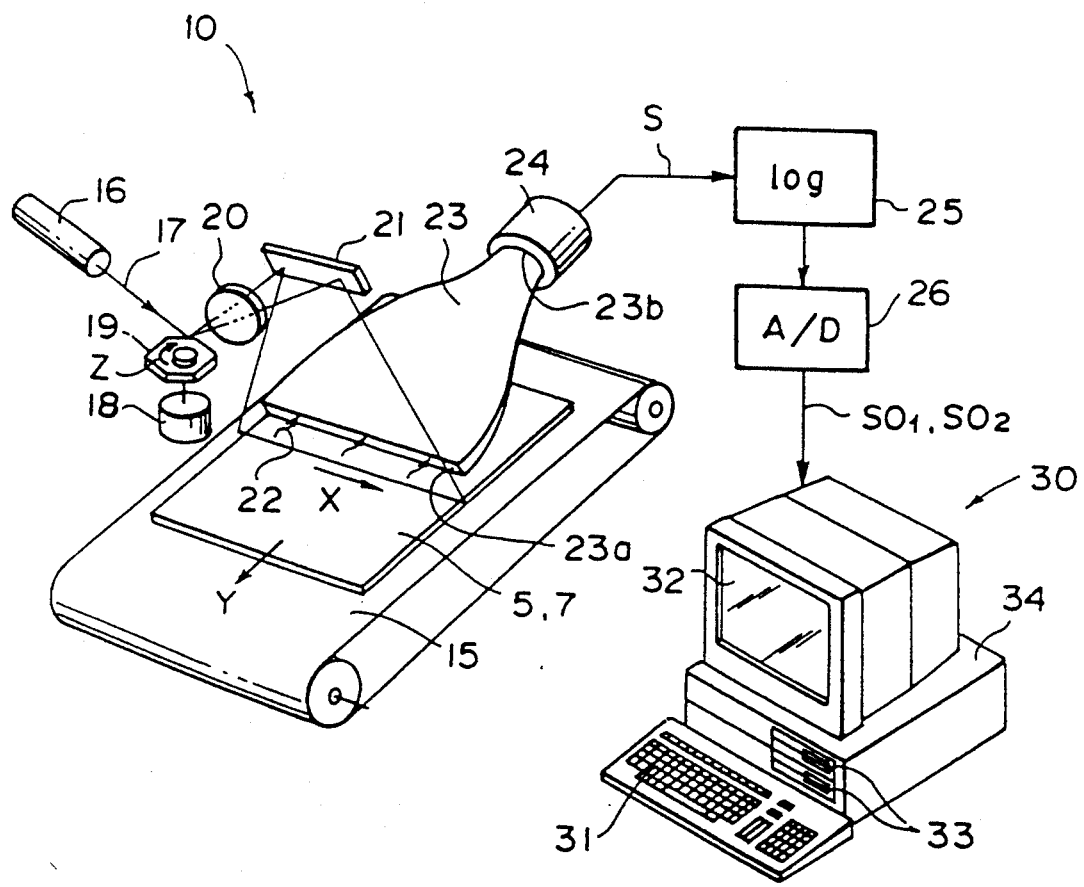
FIG. 3 is a perspective view showing an X-ray image read-out apparatus and an image processing and displaying apparatus which form a read-out unit and a calculating unit of the energy subtraction apparatus.

FIG. 3 is a perspective view showing an X-ray image read-out apparatus and an image processing and displaying apparatus which form a read-out unit and a calculating unit of the energy subtraction apparatus.

The first and second stimulable phosphor sheets 5 and 7 storing thereon the first and second radiation images 4a and 4a' are in a predetermined position in an X-ray image read-out apparatus 10 one by one. The first X-ray image 4a is read out from the first stimulable phosphor sheet 5 as is described hereinbelow, by way of example.

In FIG. 3, the first stimulable phosphor sheet 5 set in the predetermined position is conveyed in a subscanning direction indicated by the arrow Y by a sheet conveyance means 15, which is constituted of an endless belt or the like and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which is constituted of an fθ lens or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image 4a stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image 4a, which was stored on the first stimulable phosphor sheet 5, and will hereafter be referred to as the first image signal $SO_1$. The first image signal $SO_1$ is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

In the similar manner, a second image signal $SO_2$ which represents the second X-ray image 4a' stored on the second stimulable phosphor sheet 7 is also stored in the internal memory of the image processing and displaying apparatus 30.

The first and second image signals $SO_1$ and $SO_2$ are then read out from the internal memory and are corrected so that the X-ray images represented by them are equalized in size. Such calculation is performed in the main body 34 having the CPU and the like. The combination of the hardware and the software for performing the calculation can considered to be the correction unit as defined in this invention.

Calculations for size correction, rotation and position adjustment of the image signals $SO_1$ and $SO_2$ in this embodiment will be described, hereinbelow.

When the coordinates of each sampling point on the first X-ray image carried by the first image signal $SO_1$ are represented by $(X_1, Y_1)$, and the coordinates of each sampling point on the second X-ray image carried by the second image signal $SO_2$ are represented by $(X_2, Y_2)$, the first and second X-ray images can be superposed one on another by transforming the coordinates of the first X-ray image according to the following Helmert's transform formula.

$$\begin{pmatrix} X_2 \\ Y_2 \end{pmatrix} = \begin{pmatrix} a & b \\ -b & a \end{pmatrix} \cdot \begin{pmatrix} X_1 \\ Y_1 \end{pmatrix} + \begin{pmatrix} c \\ d \end{pmatrix} \quad (1)$$

wherein a, b, c and d are coefficients. In the coordinate transformation according to the formula (1), uniform enlargement or contraction of the whole first X-ray image, rotation of the whole first X-ray image, translation of the first X-ray image in the X-direction and translation of the first X-ray image in the Y-direction are effected at one time.

The coefficients a, b, c and d in the formula (1) are obtained as described, hereinbelow.

The formula (1) can be divided into the following two formulae.

$$X_2 = aX_1 + bY_1 + c \quad (2)$$

$$Y_2 = -bX_1 + aY_1 + d \quad (3)$$

When the coordinates of the marks 8a and 9a on the first X-ray image are respectively represented by $(X_{11}, Y_{11})$ and $(X_{12}, Y_{12})$, and the coordinates of the marks 8a' and 9a' on the second X-ray image are respectively represented by $(X_{21}, Y_{21})$ and $(X_{22}, Y_{22})$, the following formulae can be derived from the formulae (2) and (3).

$$X_{21} = aX_{11} + bY_{11} + c \quad (2a)$$

$$X_{22} = aX_{12} + bY_{12} + c \quad (2b)$$

$$Y_{21} = -bX_{11} + aY_{11} + c \quad (3a)$$

$$Y_{22} = -bX_{12} + aY_{12} + c \quad (3b)$$

Since the number of the coefficients to be obtained is four, the coefficients a, b, c and d can be obtained from the four formulae (2a), (2b), (3a) and (3b). Though, in this embodiment, the first and second X-ray images are superposed one on another by transforming the coordinates of the first X-ray image, they may be superposed one on another by transforming the coordinates of the second X-ray image, or by transforming the coordinates of both the first and second X-ray images.

After the coefficients a, b, c and d are thus obtained, the first image signal SO1 and the second image signal SO2 are weighted, and the image signal components of the weighted image signals which represent the image information stored at corresponding picture elements in the two X-ray images are subtracted from each other according to the following formula.

$$S1 = Ka \cdot SO_2 - Kb \cdot SO_1 + Kc \quad (4)$$

wherein Ka and Kb represents weight coefficients and Kc represents a bias component. Thus the energy subtraction processing is performed and an image signal S1 representing the difference between the first and second X-ray images is generated.

The picture element on each of the first and second X-ray images which corresponds to a given picture element on the other X-ray image is described hereinbelow.

FIG. 4 schematically shows the picture elements in the first X-ray image (the upper portion) and those in the second X-ray image (the lower portion). Each of the dots in FIG. 4 represents a picture element, and the image signal components corresponding to the respective picture elements have been read out.

For example, when the calculation according to the formula 4 is to be effected on the picture element which exists at $(X_2, Y_2)$ on the second X-ray image, coordinates $(X_1, Y_1)$ on the first X-ray image which correspond to coordinates $(X_2, Y_2)$ on the second X-ray image are first obtained according to the inverted calculation of the formula (1), i.e., according to the following formulae.

$$X_1 = (aX_2 - bY_2 + bd - ac)/(a^2 + b^2) \quad (5)$$

$$Y_1 = (bX_2 + aY_2 - ad - bc)/(a^2 + b^2) \quad (6)$$

Generally there is no image signal component corresponding to coordinates $(X_1, Y_1)$ and the image signal component corresponding to $(X_1, Y_1)$ is obtained by interpolation calculation on the basis of the image signal components of the first image signal corresponding to coordinates around $(X_1, Y_1)$, for instance, $(x_i, y_j)$, $(x_{i+1}, y_j)$ and $(x_i, y_{j+1})$. The interpolation calculation may be effected by various known methods. For example, the image signal component $SO_1$ of the first image signal which corresponds to coordinates $(X_1, Y_1)$ can be obtained according to the following formula.

$$SO_1 = SO_{11} + \{(X_1 - x_j)(SO_{12} - SO_{11})/(x_{i+1} - x_i) + (Y_1 - y_j)(SO_{13} - SO_{11})/(y_{j+1} - y_j)\}/2 \quad (7)$$

wherein $SO_{11}$, $SO_{12}$ and $SO_{13}$ respectively represent the image signal components of the first image signal corresponding to coordinates $(x_i, y_j)$, $(x_{i+1}, y_j)$ and $(x_i, y_{j+1})$. The first image signal component $SO_1$ thus obtained and the second image signal component $SO_2$ corresponding to coordinates $(X_2, Y_2)$ are subjected to the subtraction processing according to the formula (4).

In this embodiment, the coordinate transformation according to the formulae (5) and (6), the interpolation according to the formula (7), and the subtraction processing according to the formula (4) are performed one picture element by one picture element. Accordingly, it is not necessary to store the corrected image signal which represents a whole radiation image and accordingly, no additional memory is required.

In the embodiment described above, a pair of stimulable phosphor sheets are. However a single stimulable phosphor sheet having a plurality of stimulable phosphor layers superposed one on another may be used. Further, the first and second image signals may be obtained by reading out X-ray images stored on a single stimulable phosphor layer at portions near one side thereof and near the other side thereof.

The recording sheet employed in this invention need not be limited to the stimulable phosphor sheet employed in the embodiment described above but may be other recording media such as an X-ray film which is generally used together with an intensifying screen.

What is claimed is:

1. A method of energy subtraction for a radiation image having a plurality of picture elements, comprising the steps of:
    recording a plurality of radiation images of an object on one or more recording sheet by exposing the recording sheet to radiation having passed through the object, said one or more recording sheets being exposed, respectively, to different energy distributions of said radiation;

reading out the plurality of radiation images, thereby obtaining a plurality of image signals, respectively, for each of said radiation images;

correcting one or more of said plurality of image signals from one or more energy distributions such that the corrected image signal correspond with image signals from a different energy distribution;

superimposing the respective, corrected image signals and the image signals from a different energy distribution; and subtracting the corrected, superimposed image signals;

wherein said correcting step, said superimposing step and said subtracting step are performed consecutively, picture element by picture element.

2. A method of energy subtraction, as defined in claim 1, in which said plurality of radiation images are respectively recorded on a plurality of recording sheets, said plurality of recording sheets being superimposed and having a filter therebetween.

3. A method of energy subtraction, as defined in claim 1 or 2, in which said recording sheet is a stimulable phosphor sheet.

4. An apparatus for energy subtraction for a radiation image comprising:

a recording unit having a radiation source which emits radiation, an object positioning portion at which an object is positioned and a recording sheet supporting portion at which is positioned a recording sheet assembly on which a plurality of radiation images of said object are recorded by exposing said recording sheet assembly to radiation having passed through the object, said plurality of radiation images each including a plurality of picture elements and each being representative of a different energy distribution;

read-out means for reading out the plurality of radiation images recorded on said recording sheet assembly, thereby obtaining a plurality of image signals, respectively, for the different energy distributions;

a correction unit for correcting one or more of said plurality of image signals for one or more energy distributions such that the corrected image signal correspond with image signals from a different energy distribution;

superimposing means for superimposing the radiation images represented by the respective, corrected image signals with the corresponding image signal(s) from a different energy distribution; and calculation means for subtracting the corrected, superimposed image signals;

wherein said correction means, said superimposing means and said calculation means operate consecutively, picture element by picture element.

5. An apparatus for energy subtraction, as defined in claim 4, in which said recording sheet assembly comprises a plurality of recording sheets, said plurality of recording sheets being superimposed and having a filter therebetween.

6. An apparatus for energy subtraction, as defined in claim 4 or 5, in which said recording sheet is a stimulable phosphor sheet.

* * * * *